(No Model.) 2 Sheets—Sheet 1.
W. A. CROWDUS.
SECONDARY BATTERY.
No. 599,315. Patented Feb. 22, 1898.
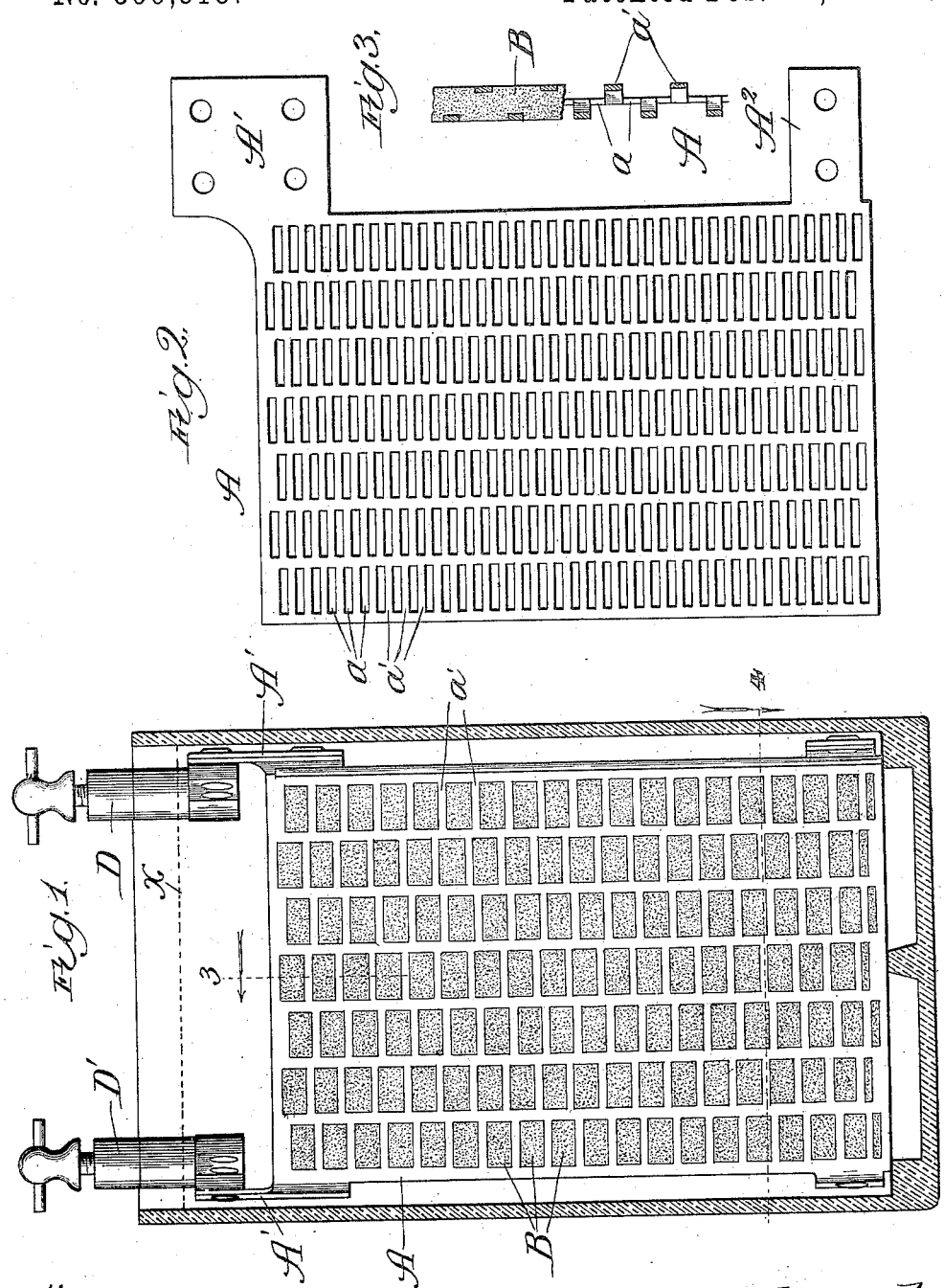
Witnesses:
Chas. E. Gaylord,
Luter J. Ott
Inventor:
Walter A. Crowdus,
By Banning & Banning & Sheridan,
Attys (No Model.) 2 Sheets—Sheet 2.
W. A. CROWDUS.
SECONDARY BATTERY.
No. 599,315. Patented Feb. 22, 1898.
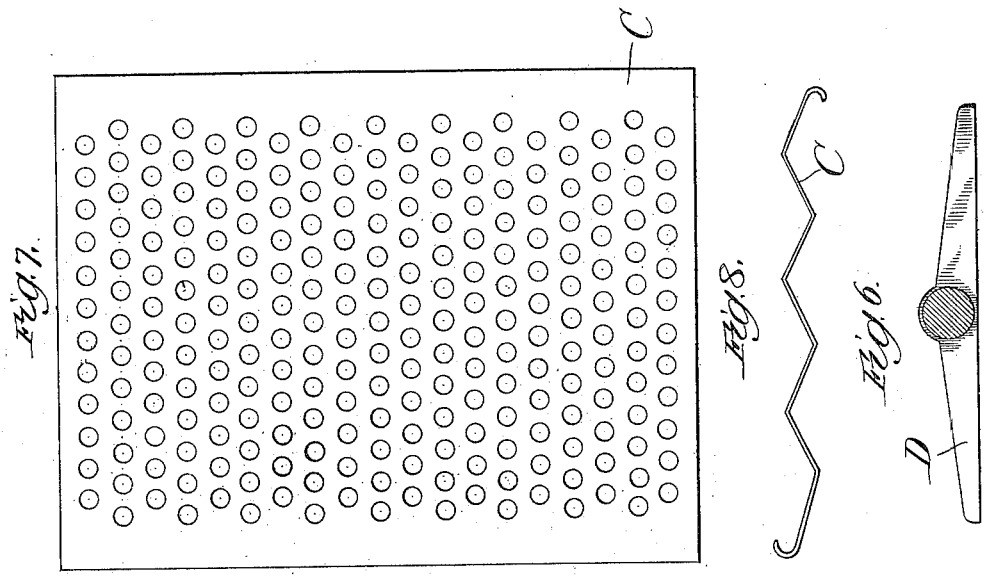
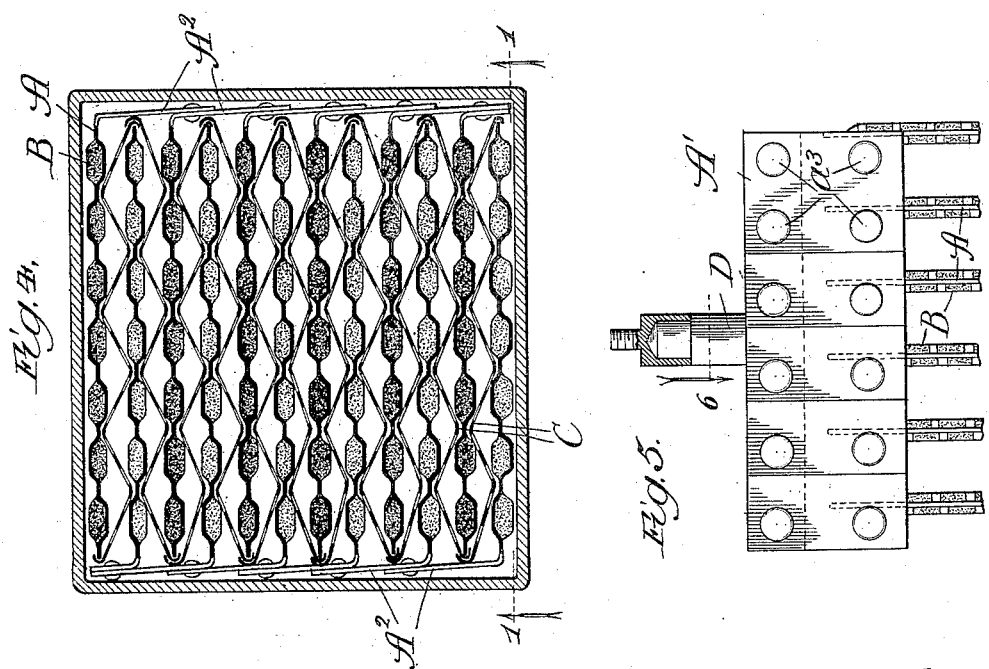
Witnesses:
Chas. E. Gaylord,
Luth. J. Peter
Inventor:
Walter A. Crowdus,
By Banning & Banning & Sheridan,
Attys.
THE NORRIS PETERS CO., PHOTO-LITHO., WASHINGTON, D. C.

UNITED STATES PATENT OFFICE.

WALTER A. CROWDUS, OF CHICAGO, ILLINOIS.

SECONDARY BATTERY.

SPECIFICATION forming part of Letters Patent No. 599,315, dated February 22, 1898.

Application filed January 25, 1897. Serial No. 620,582. (No model.)

*To all whom it may concern:*

Be it known that I, WALTER A. CROWDUS, a citizen of the United States, residing at Chicago, in the county of Cook and State of Illinois, have invented certain new and useful Improvements in Secondary Batteries and Processes Relating Thereto, of which the following is a specification.

My invention relates especially to that type of accumulators or secondary batteries known as the "heterogeneous" formation, in which the elements are formed by applying lead salts mechanically to conducting-supports.

The object of my invention is to provide a simple, economical, and efficient secondary battery and process for manufacturing the same.

A further object of my invention is to increase the efficiency of conversion between charge and discharge, and most of all to decrease the weight of the cell without impairing its commercial value; and the invention consists principally in the improvement of the structure of the metallic supports for holding the active material and in the successful adaptation of the metal aluminium as a substitute for lead in the negative plate.

It consists, further, in the method of forming the spongy lead of the negative element.

It consists, further, in the electrolyte employed in the cell.

It consists, further, in the method of electrically connecting the elements of the battery together, so as to secure a uniform and equal electrical and chemical action over all parts of each plate.

It consists, further, in the arrangement of the insulating and bracing separators that are arranged between opposing plates; and it consists, finally, in the processes, features, combinations, and details of construction hereinafter described and claimed.

In the accompanying drawings, Figure 1 is a vertical sectional elevation of a secondary battery constructed in accordance with my improvements and taken on line 1 of Fig. 4; Fig. 2, a side elevation of a supporting conducting-plate before the active material has been applied thereto and before the plate-terminals have been bent to be secured to the adjacent plates; Fig. 3, an enlarged transverse sectional elevation of a portion of the plate with the active material applied to a portion thereof, taken on line 3 of Fig. 1; Fig. 4, a sectional view taken through the battery on line 4 of Fig. 1; Fig. 5, a side elevation of a portion of the upper part of the plates with the multiple and terminal connections; Fig. 6, a sectional view taken on line 6 of Fig. 5, showing the terminal bar; Fig. 7, a side elevation of one of the insulating-separators before it has been corrugated, and Fig. 8 an end view of one of the insulating-separators after it has been formed in the desired shape.

In the art to which this invention relates it is well known that many different kinds of conducting supporting plates and grids have been designed to prevent the active material from falling out and also to guard against "buckling" of the plates; but, as is also well known, these plates have not secured these results in the most economical or commercial manner. In order to prevent the warping or buckling of the supporting-plates, manufacturers and inventors have attempted to prevent the same by hardening them with alloys and by using an increased weight of lead, the increase of the lead being such that the metallic support presented the largest percentage of the plate, while the real active proportion thereof was relatively small. It is also well known that the attempts to use aluminium as a support for the lead paste or active material have failed for the reason that paste does not adhere readily to the aluminium, and as a consequence falls away therefrom, so that the attempt to use such material in storage batteries has been abandoned, and such material has never entered into commercial use in the art. My invention is intended to obviate these objections and to provide a simple, economical, and efficient secondary battery of very light and large capacity. In experimental use and tests I have discovered that the hitherto damaging results from the expansion of the lead salts of positive plates can be turned to good effect by using a thin or mechanically-weak rolled-lead conducting-support which is free to expand under pressure from the salts, but has its expansion directed principally in straight lines parallel with the face of the plate—that is, the plate may stretch equally in all directions, so that there is no tendency to buckle.

I also further prevent the buckling and increase the rigidity of the plates by inserting vertically corrugated and perforated insulating-separators between each pair of elements in the battery.

In constructing a secondary battery in accordance with my improvements I make a positive plate A of thin rolled sheet-lead and provide the same with a series of rectangular or elongated perforations $a$. The supporting-plate is provided with terminals A' and A² at the top and bottom portion thereof, so that plates of the same polarity may be electrically connected together at the top and bottom and thus insure uniform electrolytic action. The ribs $a'$, formed by and between the elongated perforations, are bent alternately to opposite sides of the plate, so as to form longitudinal recesses substantially the entire length of the plate and openings on each side thereof to hold the active material B, which consists, preferably, of a specially-prepared hard, but porous, paste of red lead. This arrangement permits of a very light plate, the presenting of a large active surface, and a greater amount of active material than any other form of construction.

In order to make my improved negative element, I use a plate similar to the plate above described in connection with the positive element and shown in Figs. 1, 2, and 3 of the drawings, with the exception that I use a metal aluminium for the supporting-plate instead of lead, and the same paste for active material. By placing the material in the plate, as shown in Fig. 3 of the drawings, it is locked therein from side to side and throughout its entire length, as in a cage, and prevented from falling out, while at the same time the surface of the active material represents a larger percentage of the surface of the plate than ever accomplished before, thereby greatly increasing the surface of the active material and the output of the plate, the weight of the cell being also largely decreased per unit of work. In practice the weight of my positive lead support when compared to the active material on it is as one to two, a result never practically obtained before.

The elements are connected together by bending the terminals A' A² substantially at right angles to the plate and connecting the plates of similar polarity to each other by means of rivets $a^3$ for the negative plate, and also by autogeneous soldering in the positive plate. The sets of plates are then immersed in the special forming-bath, consisting of an aqueous solution of about one-third saturation of sulfate of zinc with fifteen per cent., by volume, of sulfuric acid. In this solution I place the plates to be formed, suitably arranged between sheet-lead anodes as dummies, and pass a current of about one ampere for every three square inches of the plates to be formed. On passing current to the plates the sulfate of zinc is decomposed, depositing pure zinc upon the negative-pole plates, which is redissolved from the plate as fast as it is deposited by the sulfuric acid of the solution, thus producing a quantity of hydrogen; and by the reducing action of the hydrogen the oxid of lead is rapidly converted into spongy lead. By this process the time of formation is reduced to about two hours—about one-fifteenth of the time required in the processes in actual use at present. By this method of forming the element the dissolved zinc is returned to the solution, so that the same solution can be used over and over again for an indefinite period; and I have found in experimental tests that the positive plates when first formed into negatives or spongy lead by my process and then into positives will give almost their full output on the first discharge, while the old methods require several charges and discharges before the positive plates are fully formed. I therefore also quicken and cheapen the formation of my positive plates by the use of my quick negative formation.

After "formation" the elements are placed in the battery, as shown in the sectional view in Fig. 4, and in order to strengthen and insulate the plates and prevent warping or buckling of the same I insert between the opposing pairs of plates a corrugated insulating perforated separator C, which contacts such plates at their inactive portions. By this arrangement no active material is covered by contact with the insulating rubber separator, and the internal resistance of the cell is thereby greatly reduced. I then secure to the terminals of the positive lead plates a T-shaped terminal lug D, of lead, and a similarly-shaped lug D', of aluminium, to the aluminium terminals of the negative plates, to which the circuit-wires are intended to be attached.

It is well known in this art that each time a cell is recharged the negative element decreases in capacity and that after a time a reversal of the polarity of the positive and negative elements is necessary to bring the cell back to its original capacity. I avoid this and increase the efficiency of the conversion between charge and discharge by adding to the usual sulfuric acid electrolyte—with which all batteries are supplied—a very small proportion of sulfate of zinc, just sufficient to hasten, as described in my forming-bath, the restoring of the negative element, so that its full capacity is restored fully as quickly as that of the positive element.

In the construction of storage batteries all builders connect the elements together by a terminal at the top end of and at one point only. I have discovered that in connecting the elements in this manner in the charge or discharge of the battery the escape of the current to and from the positive and negative plates is greatest nearer to the terminal lugs and that it gradually decreases to the more remote points. This action brings about uneven electrolysis upon the plates to the extent that one portion of the plate—that nearest the terminal—is exhausted or restored quicker than the more remote portions, in consequence of which the capacity of the battery is decreased below the capacity of the active material. It also produces partial polarization and unequal expansion and consequent distortion or warping of the plates. In my construction I remove these objections and obtain a much more uniform electrolysis on every portion of the plate by connecting the plates of similar polarity at two or more points below the line of the electrolyte, as shown by the dotted line X in Fig. 1 of the drawings. In the drawings I show the plate as provided with two terminals A' and A². It will be understood, however, that instead of using two terminals I may use but one, and have that one extending nearly the entire length of the plate; or three terminals, or even more, may be used.

In further carrying out the benefits derived from the above-described points I place the plates of opposite polarity in juxtaposition with each other, so that the connected edges are on opposite sides of the pile. Further, in the use of batteries the terminals of the plates or the elements above or outside of the electrolyte are destroyed by the sulfating of the lead due to the combined corrosive action of the air and acid, and large heavy lugs are resorted to to overcome this. I avoid this objection by completely immersing the terminals of the elements at the points where they connect, so that I can successfully use thin plates in my elements where hitherto destructive sulfating has made it impossible.

While I have described my invention with more or less minuteness as regards details and as being embodied in certain precise forms, I do not desire to be limited thereto unduly or any more than is pointed out in the claims. On the contrary, I contemplate all proper changes in form and degree, the omission of immaterial elements, and the substitution of equivalents, as circumstances may suggest or necessity render expedient.

I claim—

1. The process of forming negative or spongy lead elements in secondary batteries, which consists in immersing plates coated with lead oxid in a solution of sulfate of an easily-oxidizable metal and sulfuric acid, and passing a current to the plates immersed therein.

2. The process of forming the negative elements of spongy lead for use in secondary batteries, which consists in immersing plates coated with lead oxid in a solution of sulfate of zinc and sulfuric acid, and then passing a current through the solution and to the plates.

3. A conducting supporting-plate for secondary-battery elements with its complemental active material, composed of a thin sheet of metal having a multiplicity of elongated perforations having the bars formed by the perforations deflected or bent to opposite sides of the plate so as to form open channels extending longitudinally and transversely through the plate.

4. A conducting supporting-plate for secondary-battery negative elements, composed of a thin sheet of the metal aluminium having a multiplicity of elongated perforations, and having the bars formed by the perforations deflected or bent to opposite sides of the plate so as to form open channels extending longitudinally and transversely through the plate.

5. In a storage battery and in combination with the supporting-plates and positive and negative elements having their active and inactive portions arranged in alternating lines, a non-conducting perforated and corrugated separator for the plates having the apex of its angles or edges contacting with the supporting-plates out of line with the active surface and in line with the inactive portion of the plate.

WALTER A. CROWDUS.

Witnesses:
THOMAS F. SHERIDAN,
THOMAS B. MCGREGOR.